Figure 1:
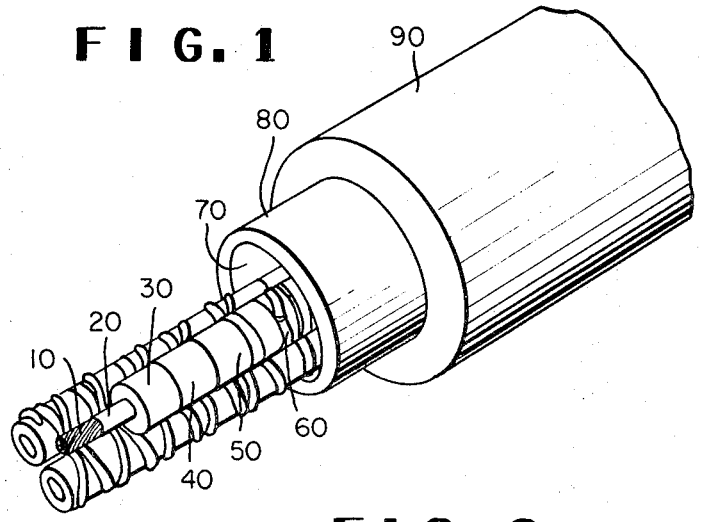
Figure 2:
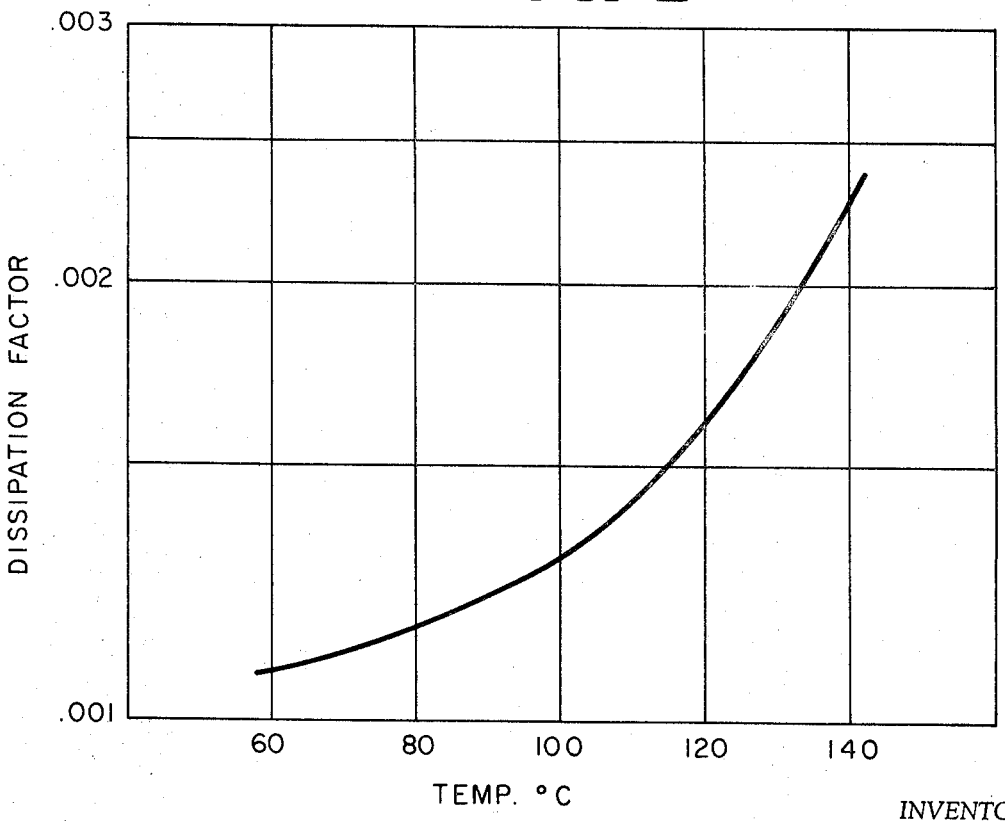

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MAY 4, 1971

886 O.G. 6

T886,009
TRANSMISSION CABLES
David E. Hoiness, Wilmington, Del., assignor to E. I. du Pont de Nemours and Company, Wilmington, Del.
Filed July 15, 1970, Ser. No. 55,030
Int. Cl. H01b *9/06*
U.S. Cl. 174—25
1 Sheet Drawing. 10 Pages Specification

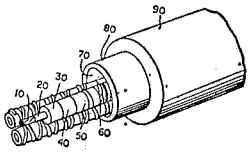

A cable for the high voltage transmission of electrical power which is composed of a conductive wire wrapped with several layers of insulative and shielding materials. One such insulative material in an oil impregnated paper in which the oil is a cable oil and the paper is composed of a mixture of aromatic polyamide fibrids and fibers (e.g., fibrids and fibers of a wholly aromatic polyamide such as poly(meta-phenylene isophthalamide). The cables have low electrical loss properties due to the low dissipation loss factor and the good dielectric strength of the above-identified paper.

May 4, 1971 D. E. HOINESS T886,009

TRANSMISSION CABLES

Filed July 15, 1970

INVENTOR

DAVID E. HOINESS

BY Gary A Samuels

ATTORNEY